United States Patent [19]

Harris

[11] 4,185,588
[45] Jan. 29, 1980

[54] PET FEEDING APPARATUS

[76] Inventor: Joseph R. Harris, 3711 S. King Dr., Chicago, Ill. 60653

[21] Appl. No.: 868,666

[22] Filed: Jan. 11, 1978

[51] Int. Cl.$^2$ ............................................... A01K 5/00
[52] U.S. Cl. .................................................. 119/51.12
[58] Field of Search .................... 119/51.11, 51.12, 61, 119/62

[56] References Cited
U.S. PATENT DOCUMENTS

| | | | |
|---|---|---|---|
| 2,813,509 | 11/1957 | Bruno | 119/61 X |
| 3,599,608 | 8/1971 | Esquival | 119/51.12 |
| 3,631,840 | 1/1972 | McCormack | 119/51.12 |
| 3,646,912 | 3/1972 | Gardner | 119/51.12 |
| 3,785,348 | 1/1974 | Polidori, Sr. et al. | 119/62 |

*Primary Examiner*—Hugh R. Chamblee
*Attorney, Agent, or Firm*—Garrettson Ellis

[57] ABSTRACT

A pet feeding apparatus is provided which comprises a box enclosing a feeding space, and openable and closable door means to provide access thereto. The door is spring biased in the open position, while a latch member is adapted to retain the door means in the closed position. Timer means may be set to release the latch member to permit the door means to open at a preset time. The box is attached to an enlarged, flat platform of a length and width larger than the box so that a pet, eating food from the feeding space, normally stands on the platform, and thus cannot accidentally tip or move it while feeding. Also, sound generating means such as a bell may be actuated by the opening door to attract the pet. A novel timer-actuated electrical circuit system may be used to disengage the latch member to open the door.

8 Claims, 6 Drawing Figures

PET FEEDING APPARATUS

BACKGROUND OF THE INVENTION

Numerous U.S. patents deal with various types of automatic, timed pet feeding devices. Examples of these include Marzocco U.S. Pat. No. 3,982,501; Lane U.S. Pat. No. 3,942,478; and Fleming U.S. Pat. No. 3,763,825, to name just a few.

One significant problem with any pet feeding apparatus is that a hungry animal is likely to push it around or tip it while eating, especially when, as is the case with timed feeding apparatus, the food may be inaccesible to the animal because the automatic feed dispensing mechanism has not yet operated. In this instance, a large animal may knock the feeding apparatus over and even break it.

Also, there is a need for a reliable, efficient timing and unlatching mechanism to release a swinging door and expose the feeding space at a desired time which can be controlled by the user.

Solutions to these problems by this present invention, and other advantages of this invention, are described below.

DESCRIPTION OF THE INVENTION

In accordance with this invention, a pet feeding apparatus is provided which comprises a box enclosing a feeding space. The box carries an openable and closable door means, to provide access to the feeding space within the box. The door means is spring-biased, to be normally retained in the open position, but a latch member is provided for retaining the spring-biased door means in the closed position. Timer means are provided which may be set to release the latch member, preferably by means of a novel electrical circuit as shown below, to permit the door means to open at a preset time, exposing the feeding space.

The box of the apparatus of this invention may be attached to an enlarged, flat platform of a length and width larger than the box, so that a pet, while eating food from the feeding space, normally stands on the platform, and thus cannot accidentally tip or move the box while feeding, or attempting to get at the food while the door means is still closed.

Also, a sound generator such as a bell or the like may be included in the feeding apparatus, to be actuated upon release of the latch member and opening of the door.

The latch member may desirably be a hinged member attached to an upwardly swinging door member. In that case, a magnet may be attached to the inner surface of a stationary portion of the box, the magnet being positioned to attract and grip the latch member in interlocking, latching relation when the latch is in closed position.

Figure 1:
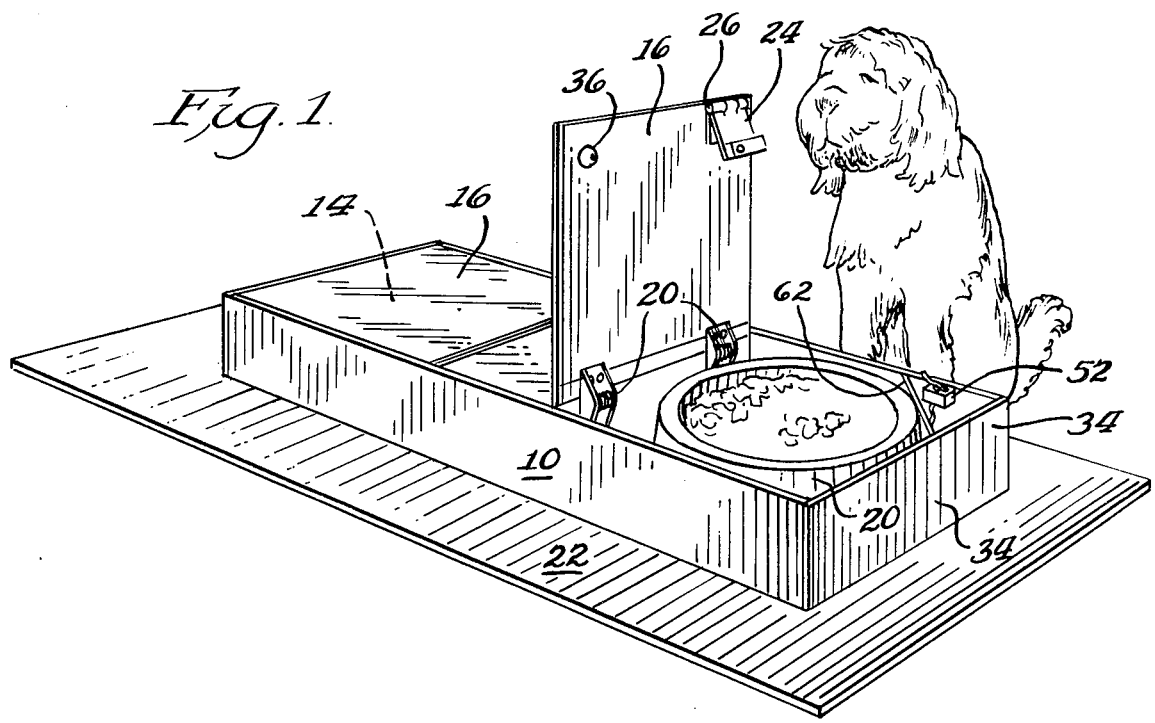
FIG. 1 is a perspective view of the pet feeding device of this invention.

Referring to the drawings, the apparatus of this invention comprises a container or box 10 which defines a pair of food-containing compartments 12, 14, each of which may be closed by identical, vertically-swingable doors 16, 18, secured to central partitions 19 of box 10 by hinges 20. Hinges 20 are of the spring-biased type, to urge each door 16, 18 upwardly into the open position.

The animal feed may be placed within each compartment 12, 14 in a bowl 20, with the respective doors 16, 18 being closed until a predetermined time when the doors are opened for access by the animal.

Box 10 is firmly attached to a lower, flat platform 22. Platform 22 may preferably be at least about 18 by 36 inches, or larger, and serves as a stablizing member for food-containing box 10. An animal, even a large animal, seeking food from the apparatus of this invention will normally place at least its forefeet upon platform 22 while feeding. Accordingly, even if the animal pushes the food or the box roughly during feeding, or while seeking food prior to opening of a door 16, the very weight of the animal on platform 22 serves as a stabilizing influence to prevent the animal from moving or tipping the apparatus of this invention. It thus remains in its desired location, without spillage of food through tipping or pushing.

Figure 3:
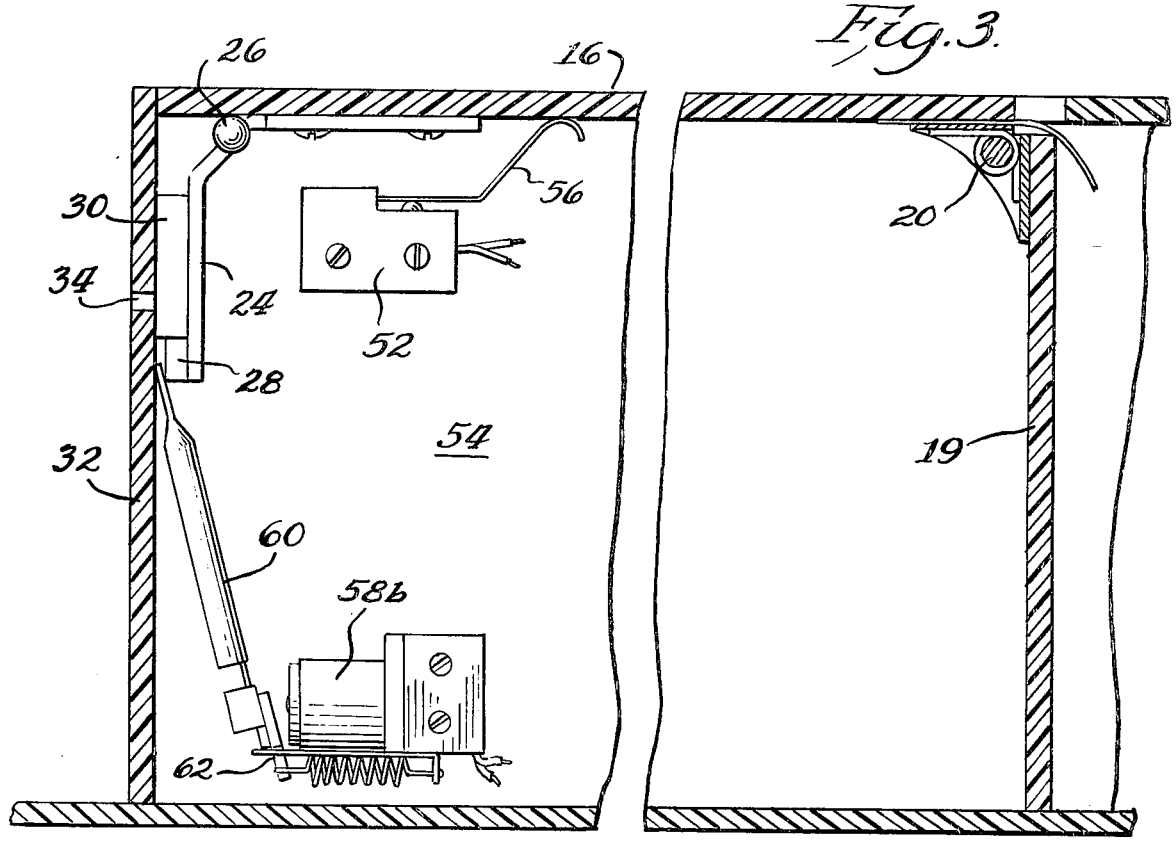
FIG. 3 is a sectional view taken along line 3—3 of FIG. 2, showing the door member in its closed position.

Each hinged, spring-biased door 16 carries a latch member 24, which is affixed to the underside of each door by a hinge 26. As particularly shown in FIG. 3, latch member 24 carries a hook member 28 at its outer end which is adapted to hook against magnet 30, which is affixed to the wall 32 of box 10 to hold door 16 in closed and latched position. Magnet 30 attracts the hinged latch 24 into a closed, locked position, with hook member 28 engaging magnet 30 to prevent the opening of door 16.

Figure 2:
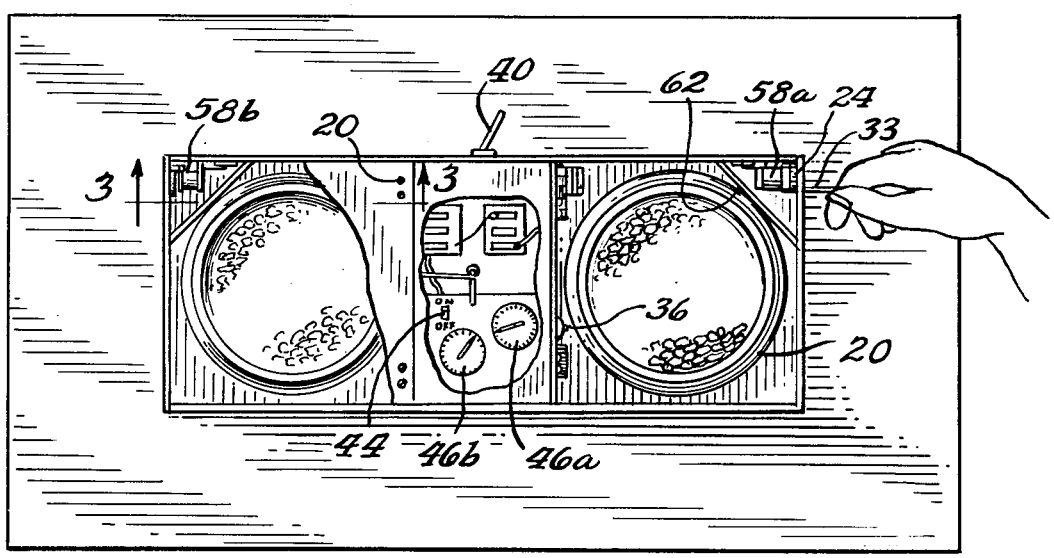
FIG. 2 is a plan view, with portions broken away, of the device of FIG. 1.

Aperture 34 may be provided in wall 32 adjacent magnet 30, to permit a piece of wire 33 or the like to be inserted, as shown in FIG. 2, to push hinged latch 24 away from magnet 30. When this happens, the door 16 will spontaneously spring upwardly, impelled by spring hinges 20.

A bell 36 may be placed on the underside of each door 16 to provide a ringing sound as the door opens. A pet will quickly learn the significance of the sound, and come immediately to the freshly-exposed food.

The timed opening of each compartment 12, 14, individually, may be achieved as follows:

Electrical circuits 48, 50, sharing some common portions, are provided for each food storage compartment 12, 14. Each of the circuits may be powered by battery means 38, which preferably is a rechargable battery, and which may be conventionally connected to a commercially-available trickler charge source of direct current 40. Trickler charge source 40 may conventionally be used to obtain power from a conventional source of line current, in order to keep the batteries 38 well charged for operation.

The circuits 48, 50 may be controlled by on/off switch 44. Conventional timer switches 46a, 46b may be provided, which close at a predetermined time as set on the face of the dial of the timer switch. Accordingly, a pet, being left alone for the day by a working person, can receive a midday and an evening meal, at the times set on the respective timer switches.

The switches may be mechanical, or they may be conventionally electrically operated, drawing power from batteries 38 or from line current as desired.

Figure 5:
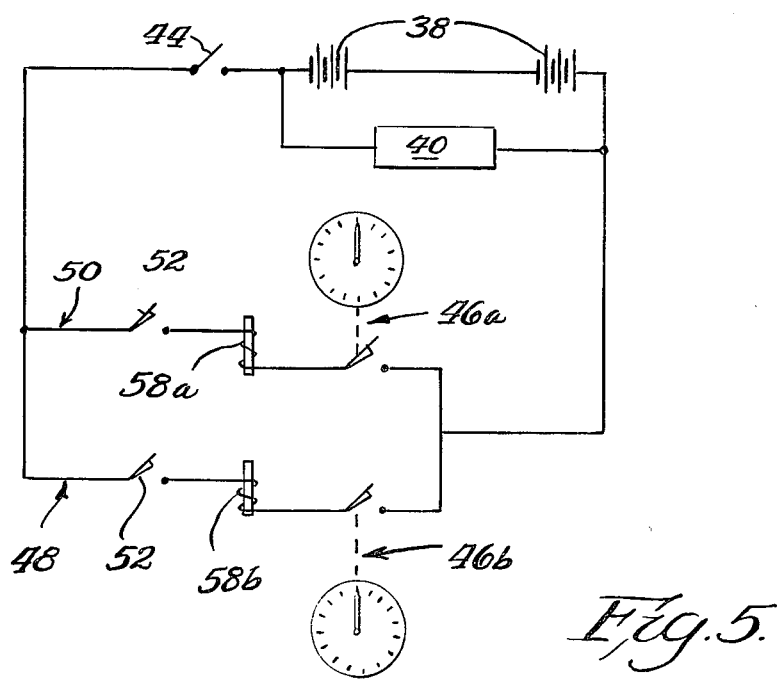
FIG. 5 is a circuit diagram of the apparatus of this invention.

The circuits 48, 50 as shown in FIG. 5 are provided for separate control of each feeding space 12, 14 each circuit 48, 50, being identical in structure and function.

Figure 4:
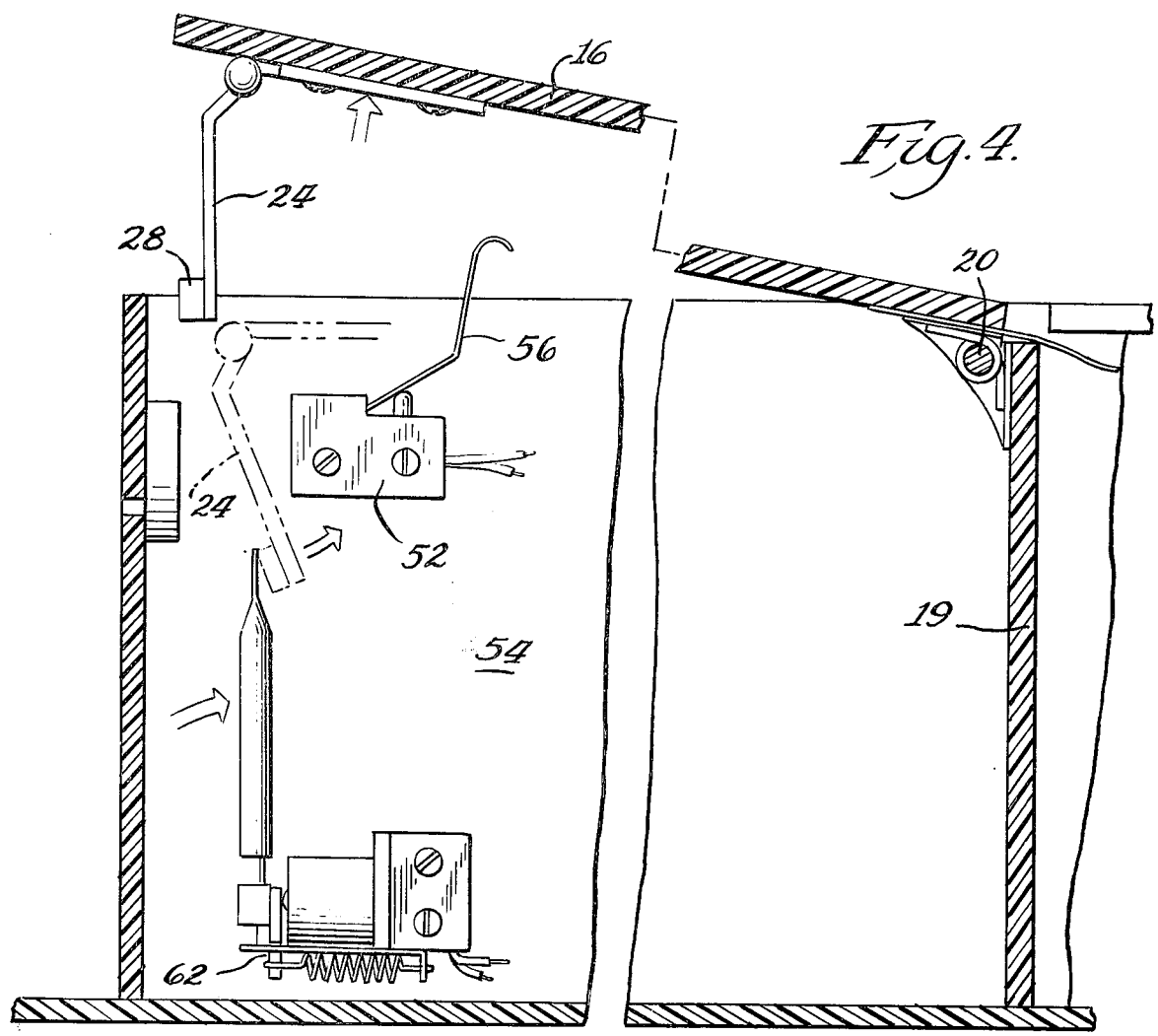
FIG. 4 is a sectional view similar to that of FIG. 3, showing the position of the latch assembly on opening the door member.
Figure 6:
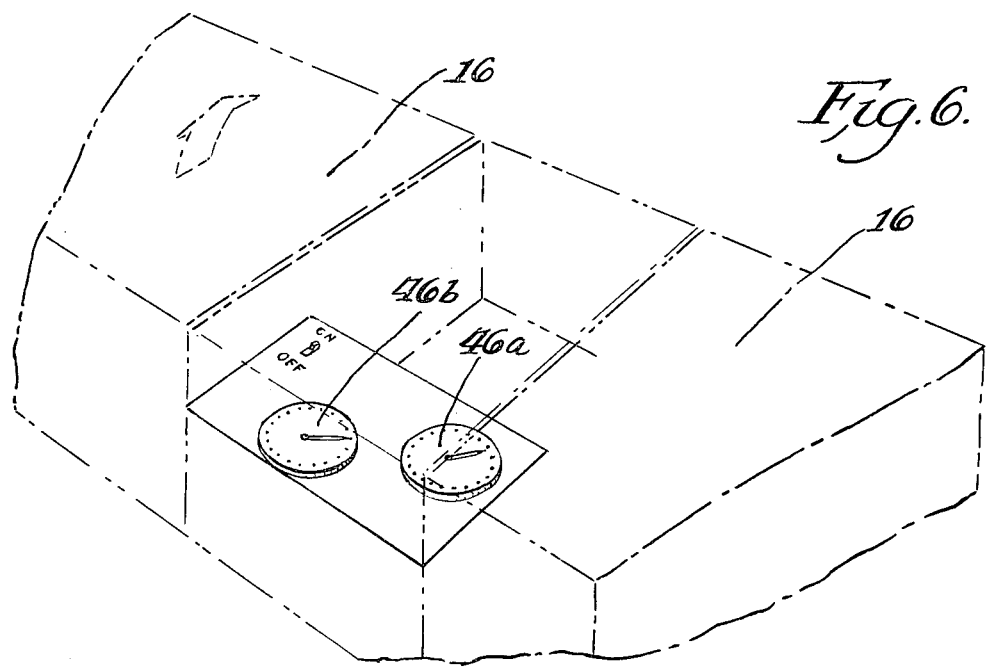
FIG. 6 is a perspective view showing further details of the apparatus of this invention.

Microswitches 52 are provided for each circuit as shown, being attached to a wall 54 of box 10. Each microswitch 52 carries a controlling arm 56 which is positioned to be depressed by lid 16 in the closed position, the depressed arm 56 positioning the microswitch 52 in the "on" position. When latch member 24 is released and door 16 swings upwardly, arm 56 is free to also swing upwardly as shown in FIG. 4, causing microswitch 52 to be shut off. This in turn prevents the unnecessary drain of power from batteries 38 after the door 16 controlled by individual circuit 48 or 50 has been opened.

Each circuit 48, 50 includes a coil magnet solenoid 58 or 58b which is adapted to act upon its associated hinged arm 60, which is pivotable about hinge 62. Each arm 60 extends to a position in engagement with a latch member 24, as shown for example in FIG. 3.

Accordingly, food may be placed in each of the compartments 12, 16, and each of the doors 16 closed. Timer switch assemblies 46 may be set to close at the desired predetermined time. Batteries 38 are charged, and on-/off switch 44 is closed. Switches 52 are in the closed position as well, since the doors 16 are in the closed position.

Accordingly, upon elapse of time and the closing of the switch of the timer assembly 46 in either of circuits 48, 50, electrical current passes through the related solenoid 58, causing arm 60 to rotate in clockwise manner toward the solenoid about pivot 62. This causes the dislodging of latch 24 from magnet 30 which, in turn, causes door 16 to spring upwardly, exposing the contents of the compartment and ringing bell 36 to attract the animal. Simultaneously therewith, the switch 52 of the actuated circuit 50 is opened so that current immediately ceases to flow through the actuated circuit.

The other compartment 12 or 14 can be similarly spontaneously opened by the action of the other timeer switch, at the time desired.

As shown in FIG. 1, a diagonal partition 62 may be provided at separate corners of box 10 to protect microswitch 52, solenoid 58, and the related parts, to separate them from the feeding areas 12, 14.

The above has been offered for illustrative purposes only, and is not for the purpose of limiting the invention of this application, which is as defined in the claims below.

That which is claimed is:

1. A pet feeding apparatus which comprises a box enclosing a feeding space, said box carrying openable and closable door means to provide access to said feeding space within the box, said door means being springbiased to be normally retained in the open position, a latch member for retaining the spring-biased door means in the closed position, and timer controlled means which may be set to release the latch member, to permit the door means to open at a preset time, exposing the feeding space, said box being attached to an enlarged, flat generally rigid platform of length and width larger than said box, whereby a pet eating food from the feeding space normally stands on the platform, and thus cannot accidentally tip or move said box while feeding, in which said door means is defined in the upper surface of said box, and is adapted to swing upwardly, said latch member comprising a hinge member attached to the lower surface of said upwardly swinging door member, and a magnet attached to the inner surface of a stationary portion of the box, said magnet being positioned to attract and grip said latch member in interlocking, latching relation when the latch is in closed position.

2. The pet feeding apparatus of claim 1 in which sound-generating means are included in the feeding apparatus, said sound-generating means being adapted to be actuated upon release of the latch member and the opening of said door means.

3. The apparatus of claim 1 which comprises a relay member, and electric circuit means for actuating said relay member to physically disengage said latch member from the magnet, to open said latch member and door means.

4. The apparatus of claim 3 in which said timer means is adapted to close a switch in said electrical circuit means to actuate the relay member at a predetermined time.

5. The apparatus of claim 4 in which said box defines an aperture to permit the insertion of a wire member into the interior of said box to physically disengage the latch member from the magnet, for manual opening of the door member.

6. The apparatus of claim 5 in which said electrical circuit includes rechargable battery means, and trickle charge means to permit recharging of said batteries from a conventional line current.

7. The apparatus of claim 6 in which said electric circuit means includes a microswitch carrying an arm, said arm being positioned to be depressed by said door in closed position, said depressed arm holding the microswitch in open position, whereby, upon opening of said door, said arm is released and the microswitch is closed, preventing electrical current flow through said circuit means.

8. The apparatus of claim 7 which comprises a pair of separate feeding spaces, door members, and latch members as previously described.

* * * * *